(12) United States Patent
Damodaran (10) Patent No.: US 9,019,898 B2
(45) Date of Patent: Apr. 28, 2015

(54) MULTI-INTERFACE WLAN DEVICE HAVING REAL AND VIRTUAL DUAL BAND OPERATION

(71) Applicant: Broadcom Corporation, Irvine, CA (US)

(72) Inventor: Deepak Kumar Damodaran, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/041,644

(22) Filed: Sep. 30, 2013

(65) Prior Publication Data

US 2015/0092737 A1    Apr. 2, 2015

(51) Int. Cl.
*H04W 4/00*    (2009.01)
*H04W 8/22*    (2009.01)

(52) U.S. Cl.
CPC .................................... *H04W 8/22* (2013.01)

(58) Field of Classification Search
USPC .................... 370/328–329, 310, 235–276
See application file for complete search history.

(56) References Cited

U.S. PATENT DOCUMENTS

| | | | |
|---|---|---|---|
| 7,613,160 B2* | 11/2009 | Kitchin | 370/345 |
| 2014/0003293 A1* | 1/2014 | Borges et al. | 370/255 |
| 2014/0192777 A1* | 7/2014 | Seok | 370/331 |
| 2014/0219194 A1* | 8/2014 | Varoglu et al. | 370/329 |

\* cited by examiner

*Primary Examiner* — Iqbal Zaidi (74) *Attorney, Agent, or Firm* — Sterne, Kessler, Goldstein & Fox P.L.L.C.

(57) ABSTRACT

A wireless local area network (WLAN) method and device including at least one antenna to enable simultaneous dual band (SDB) operation of the WLAN device, the SDB operation including communication in a first frequency band with a first device and communication in a second frequency band with a second device, first network interface circuitry to support communication in the first frequency band with the first device, second network interface circuitry to support communication in the second frequency band with the second device, and a processor to generate an information element including information regarding the SDB operation of the WLAN device, and to enable transmission of the information element to the first device or to the second device.

10 Claims, 7 Drawing Sheets

| Element ID Field 501 | Length Field 502 | Device ID Field 503 | Device – Type Field 504 | SDB Subtype Field 505 | SDB Subtype Length Field 506 | SDB Details Field 507 | SDB Features Field 508 |
|---|---|---|---|---|---|---|---|

FIG. 5

| Frame ID Field 601 | Device ID Field 602 | Frame – Type Field 603 | SDB Subtype Field 604 | SDB Subtype Length Field 605 | SDB Details Field 606 | SDB Features Field 607 |
|---|---|---|---|---|---|---|

FIG. 6

| Frame ID Field 701 | Device ID Field 702 | Frame – Type Field 703 | SDB Subtype Field 704 | SDB Subtype Length Field 705 | SDB Details Field 706 | SDB Features Field 707 |
|---|---|---|---|---|---|---|

MULTI-INTERFACE WLAN DEVICE HAVING REAL AND VIRTUAL DUAL BAND OPERATION

FIELD OF THE DISCLOSURE

The present disclosure is directed to systems and methods related to multi-interface wireless local area network (WLAN) devices having real and virtual dual band operation.

BACKGROUND

Wi-Fi is a popular technology that allows an electronic device to exchange data or connect to the internet wirelessly. Wi-Fi may be implemented using WLAN devices that function based on 802.11 standards defined by the Institute of Electrical and Electronics Engineers (IEEE). The 802.11ac standard from among the 802.11 standards is capable of providing a very high throughput (e.g., 1 Gbps). Also, the peer-to-peer (P2P) technology is an evolving technology that is introducing a number of new applications that may be implemented in the WLAN devices. Therefore, it is possible to realize very high throughput in the WLAN devices through Wi-Fi while the WLAN devices are also using P2P applications.

DETAILED DESCRIPTION

For purposes of this discussion, the term "module" or "unit" shall be understood to include one or more of software, firmware, or hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The present disclosure provides mechanisms to implement systems that allow realization of high throughput (e.g., in the range of 1 Gbps) while the WLAN products are using the P2P use cases/applications. For example, the present disclosure introduces multi-interface WLAN devices that simultaneously support more than one Wi-Fi network interface. These WLAN devices are capable of providing an interface that simultaneously supports, for example, wireless Internet activity over a first frequency band and wireless P2P activity over a second frequency band. Such a mode, in which the WLAN device simultaneously supports communication activity with separate devices over separate frequency bands, is called the simultaneous dual band (SDB) mode.

Figure 1:
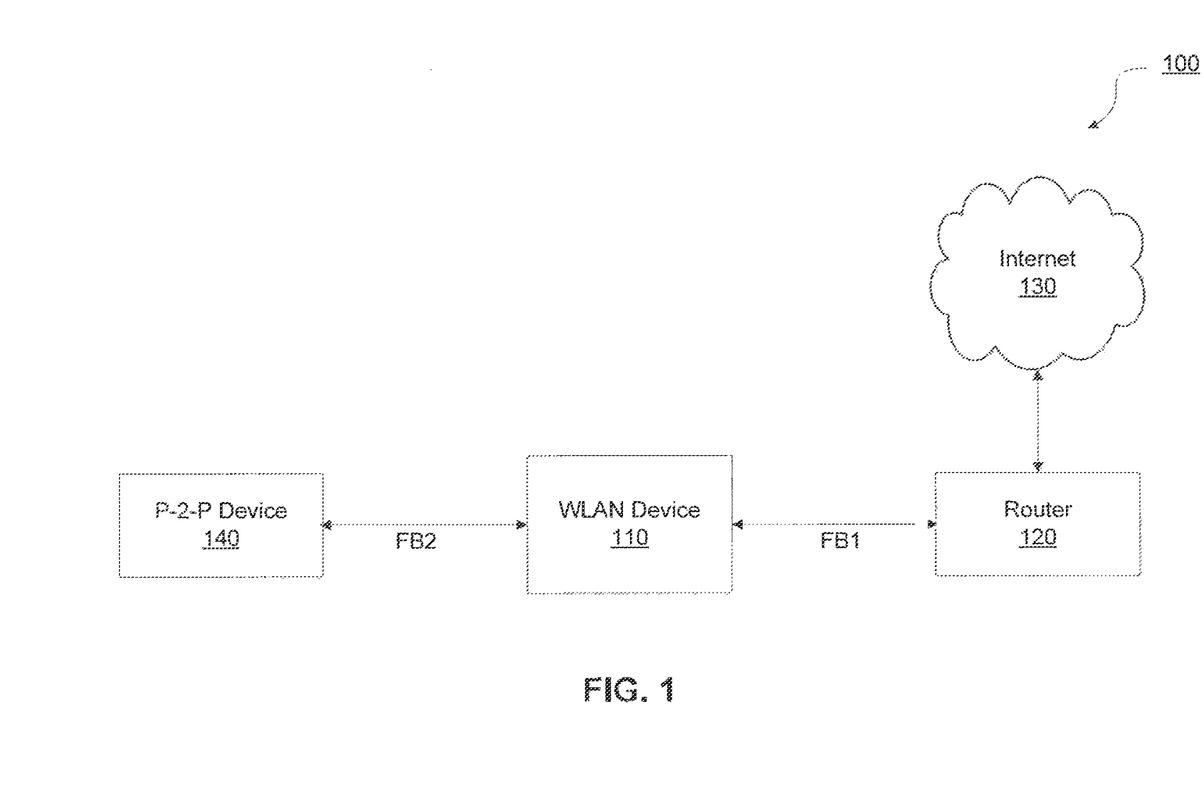
FIG. 1 illustrates an exemplary system for implementing a simultaneous dual band (SDB) system according to an embodiment of the present disclosure.

FIG. 1 illustrates an exemplary SDB system 100 according to an embodiment of the present disclosure. The SDB system 100 includes a WLAN device 110, a router 120 which provides access to the Internet 130, and a P2P device 140. The WLAN device 110 is simultaneously connected to (i) the router 120 over a first frequency band FB1 (e.g., 2.4 GHz) and to (ii) the P2P device 140 over a second frequency band FB2 (e.g., 5 GHz). In this way, the WLAN device 110 may support simultaneous communication activity with the router 120 and with the P2P device 140 over different frequency bands. In one embodiment, the WLAN device 110 may support communication activity with the Internet through the P2P device 140. For example, the WLAN device 110 may simultaneously communicate with the P2P device 140 over the first frequency band FB1 and also over the second frequency band FB2.

In an exemplary embodiment, the WLAN device 110 may be a mobile tablet that allows a user to stream an online movie on a television. In this embodiment, the mobile tablet supports simultaneous communication activity with the Internet to download the contents of the online movie over a first frequency band, and peer-to-peer activity with the television to relay the downloaded contents of the online movie over a second frequency band.

The following discussion will illustrate two embodiments of the SDB system 100, namely a real SDB system 200, 201 or as a virtual SDB system 300. Other embodiments will be realized by those skilled in art based on the discussion provided herein, where these other embodiments are within the scope and spirit of the present disclosure.

Figure 2A:
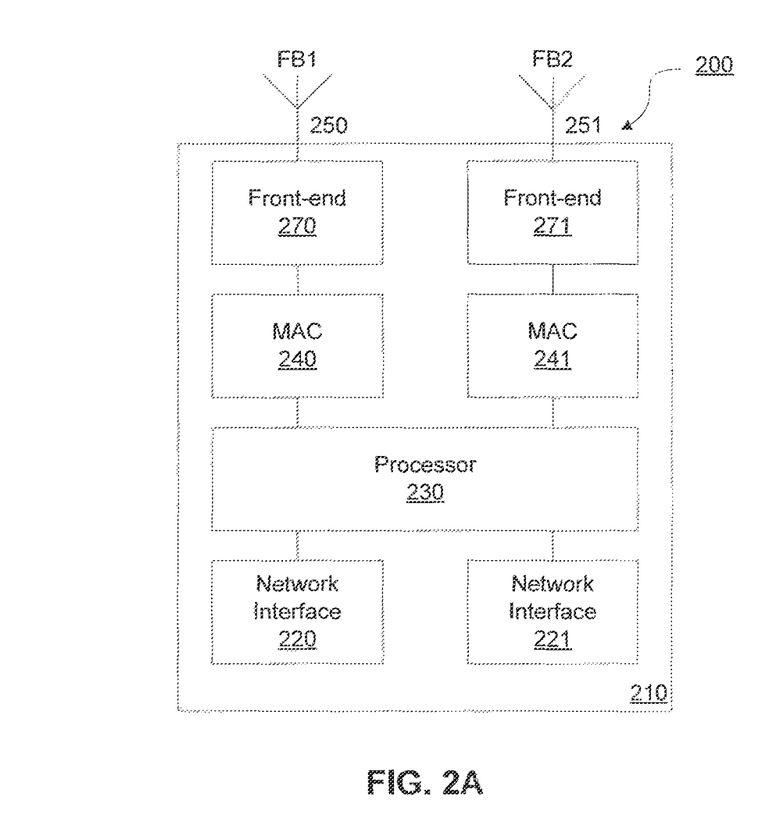
FIG. 2A illustrates an exemplary real SDB system according to an embodiment of the present disclosure.
Figure 2B:
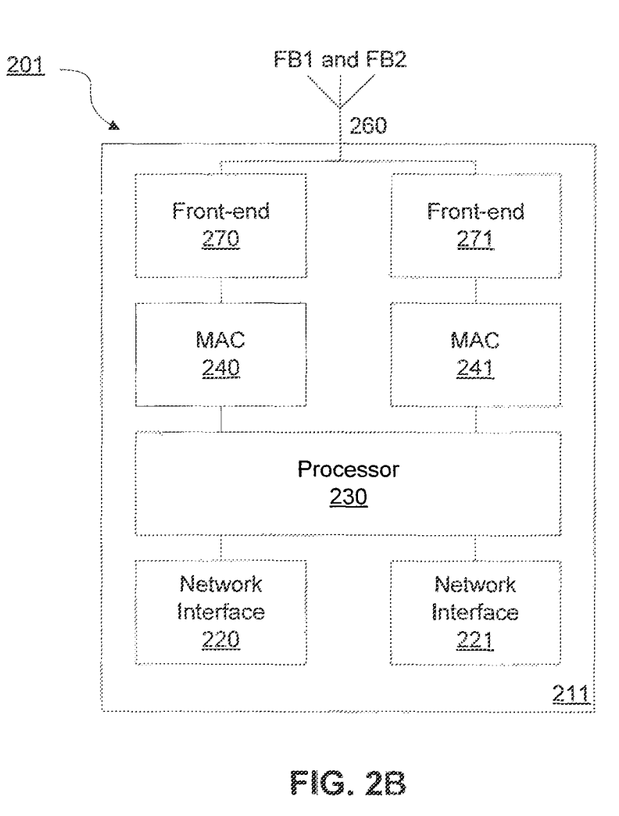
FIG. 2B illustrates an exemplary real SDB system 201 with a single antenna according to an embodiment of the present disclosure.

FIGS. 2A and 2B illustrate exemplary real SDB systems 200, 201 according to embodiments of the present disclosure. For example, FIG. 2A illustrates an exemplary real SDB system 200 with multiple antennas to support the different frequency bands. The real SDB system 200 includes a WLAN device 210. The WLAN device 210 includes a first antenna 250 that is capable of communicating with the router 120 over a first frequency band FB1 (e.g., 2.4 GHz). The first antenna 250 is supported by first network interface circuitry, in a first transceiver chain, including a front-end 270, a media access controller (MAC) 240, a processor 230, and a network interface 220. The WLAN device 210 also includes a second antenna 251 that is capable of communicating with a P2P device over a second frequency band FB2 (e.g., 5 GHz). The second antenna 251 is supported by second interface network circuitry, in a second transceiver chain, including a front-end 271, a MAC 241, the processor 230, and a network interface 221. The first and second network interface circuitry in the first and the second transceiver chains allow the WLAN device 210 to conduct simultaneous data transfer with the router 120 using a first frequency band FB1 with the P2P device using a second frequency band FB2.

FIG. 2B illustrates an exemplary real SDB system 201 with a single antenna to support the different frequency bands. The real SDB system 201 includes WLAN device 211. The WLAN device 211 includes a single antenna 260 that is capable of communicating with the router 120 over a first frequency band FB1 (e.g., 2.4 GHz) and with a P2P device over a second frequency band FB2 (e.g., 5 GHz). There is negligible interference between the communications occurring at 2.4 GHz frequency band and the 5 GHz frequency band. Therefore, the single antenna 260 is capable of simultaneously communicating over both the frequency bands with negligible interference. The single antenna 260 is supported by first network interface circuitry, in a first transceiver chain, including a front-end 270, a media access controller (MAC) 240, a processor 230, and a network interface 220, and by second network interface circuitry, in a second transceiver chain, including a front-and 271, a MAC 241, the processor 230, and a network interface 221. The first and second network interface circuitry in the first and the second transceiver chains allow the WLAN device 211 to conduct simultaneous data transfer with the router 120 and with the P2P device.

In the above WLAN devices 210, 211, each of the front-ends 270, 271 may include a radio unit and a PHY unit. In the receive path, the radio unit of a front-end 270, 271 may be used for down-converting the analog signal from the antenna and for converting the analog signal into a digital signal. The PHY unit may be used to perform demodulation and error detection/correction on the digital signal, which is then to be processed by the network interface 220, 221. In the transmit path, the PHY unit may be used to receive the digital signal from the network interface 220, 221 and to perform modulation on the digital signal, which is then converted to analog and frequency up-converted by the radio unit. The modulated signal may then be transmitted by the antenna 260.

It is useful for any device that is considering establishing communication with the WLAN device 210, 211 to be informed that the WLAN device 210, 211 is operating in the real SDB system. That is, any device that is considering establishing communication with the WLAN device 210, 211 should be informed that the WLAN device 210, 211 is capable of simultaneously communicating over both the frequency bands with negligible interference. For example, if a first device is considering establishing communication with the WLAN device 210, 211 over the first frequency band, and if the first device is aware that the WLAN device 210, 211 is communicating with a second device, then the first device may not initiate communication with the WLAN device 210, 211 because the first device may consider the WLAN device 210, 211 unavailable. However, the WLAN device 210, 211 may be communicating with the second device over the second frequency band, and may be available to communicate with the first device over the first frequency band. Therefore, to avoid the above situation, it is useful for any device that is considering establishing communication with the WLAN device 210, 211 should be informed that the WLAN device 210, 211 is operating in the real SDB system. Similarly, any device in communication with the WLAN device 210, 211 can also be informed of any changes in the real SDB operation of the WLAN device 210, 211.

Figure 3:
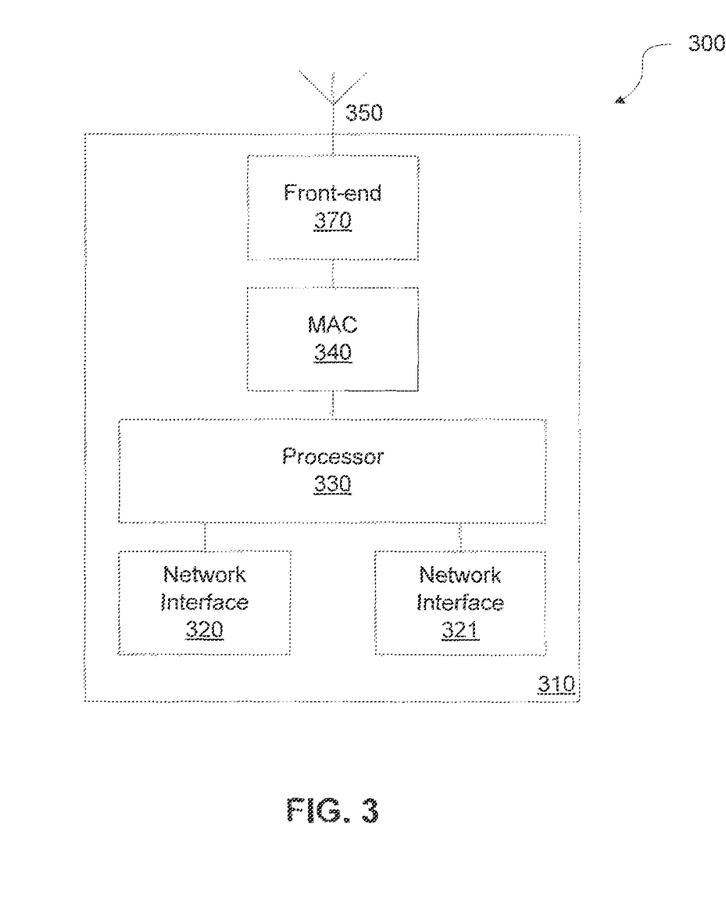
FIG. 3 illustrates an exemplary virtual SDB system 300 according to an embodiment of the present disclosure.

FIG. 3 illustrates an exemplary virtual SDB system 300 according to an embodiment of the present disclosure. The virtual SDB system 300 includes WLAN device 310. The WLAN device 310 includes an antenna 350 that is capable of communicating with the router 120 in a first frequency band FB1 (e.g., 2.4 GHz) and with a P2P device in a second frequency band FB2 (e.g., 5 GHz). The single antenna 350 is supported by network interface circuitry including front-end 370, a MAC 340, a processor 330, and network interfaces 320, 321.

In the WLAN device 310, the front-end 370 may include a radio unit and a PHY unit. In the receive path, the radio unit may be used for frequency down-converting the analog signal from the antenna 340 and for converting the analog signal into a digital signal. The PHY unit may be used to perform demodulation and error detection/correction on the digital signal to be processed by the MAC 340. The MAC 340 may perform layer-2 functionality including additional error correction, message de-framing, message routing, and other processing according to the governing protocol. In the transmit path, the MAC 340 may be used to receive the digital signal from the network interface 320, 321 or another source and to perform layer-2 functionality including media arbitration, message framing, addressing, and the like. The PHY unit in the front-end 370 may be used to perform modulation and any forward error detection, and the radio unit may perform digital to analog conversion, frequency up-conversion and any RF amplification in preparation for transmission by antenna 350. In this virtual embodiment, the front-end 370 is configured to operate over both frequency band FB1 and FB2, using for example frequency tunable components.

Since the WLAN device 310 includes a single front-end 370 and a single MAC 340, the dual band communication through the antenna 350 may be switched between the two frequency bands (or channels) based on, for example, time division multiplexing to achieve the virtual simultaneous communication. For example, in the virtual SDB system 300, the WLAN device 310 may achieve the virtual simultaneous communication by dividing, equally or unequally, a predefined communication time slot between the two frequency bands. The predefined communication timeslot maybe in accordance with a communication protocol used by the WLAN device 310, such as IEEE protocols 802.11 a/b/g/n/ac (i.e. Wi-Fi).

Figure 4:
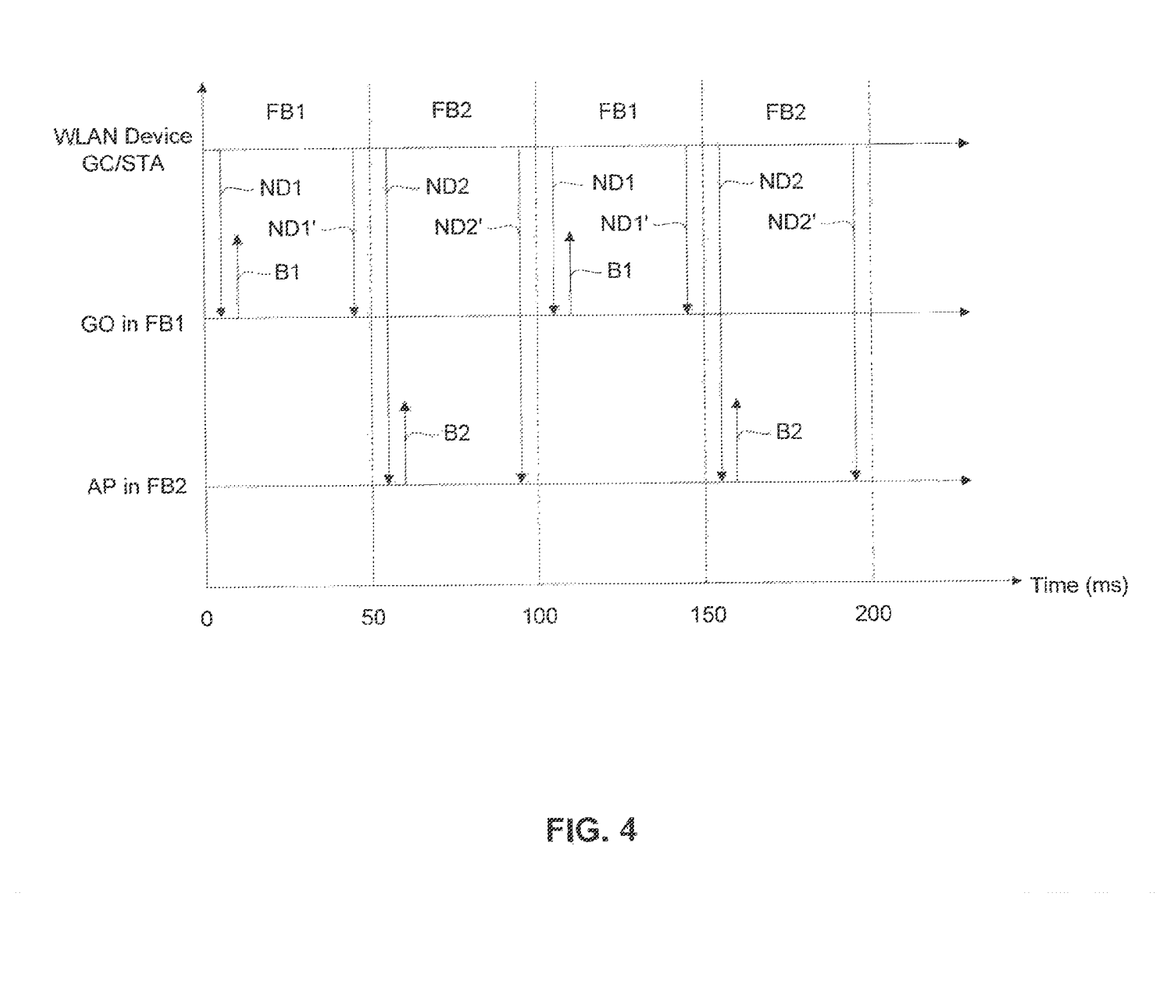
FIG. 4 illustrates an exemplary graph showing operation of a virtual WLAN device according to an embodiment of the present disclosure.

FIG. 4 illustrates an exemplary graph showing operation of the virtual WLAN device 310 during the predefined communication time slots according to an embodiment of the present disclosure. In this embodiment, the WLAN device 310 operates during a predefined communication time slot of, for example, 100 ms, and the communication time slot is equally divided in a first time slot portion for communication in the first frequency band FB1 and in a second time slot portion for communication in the second frequency band FB2. Therefore, in a given predefined communication time slot, the WLAN device 310 communicates in the first frequency band FB1 for 50 ms (first time slot portion) and then switches to communicate in the second frequency band FB2 for 50 ms (second time slot portion). Other time periods and divisions could be used as will be understood by those skilled in the arts.

In one embodiment, in the first frequency band FB1, the WLAN device 310 may operate as a Group Owner (GO) to communicate with a Group Client (GC) or may operate as a Group Client to communicate with a Group Owner. Similarly, in one embodiment, in the second frequency band FB2, the WLAN device 300 may operate as a Station (STA) to communicate with an Access Point (AP) or may operate as an Access Point to communicate with a Station. For example, the WLAN device 310 may operate as a Group Owner to communicate with the Group Client, P-2-P device 140, in the first frequency band FB1, and may operate as the Station to communicate with the Access Point, router 120, in the second frequency band FB2.

In the embodiment illustrated in FIG. 4, the WLAN device 310 is assumed to be operating as a Group Client to communicate with a Group Owner in the first frequency band FB1, and to be operating as a Station to communicate with an Access Point in the second frequency band FB2. For example, in this embodiment, the WLAN device 310 operates as a Group Client to communicate with a Group Owner in the first frequency band FB1 during the first 50 ms portion of the predefined time slot, and then switches to operate as a Station to communicate with an Access Point in the second frequency band FB2 during the second 50 ms portion of the predefined time slot. As part of the communication, the WLAN device 310 receives beacon B1 from the Group Owner and receives beacon B2 from the Access Point. These respective beacons are frames that are periodically received (e.g., every 100 ms) by the WLAN device 310 for the purposes of recognizing the current or updated capabilities of the Group Owner and/or the Access Point, and of enabling better synchronization of the WLAN device 310 with the Group Owner and/or the Access Point.

Now, during the first 50 ms portion of the predefined time slot, when the WLAN device 310 is communicating as the Group Client with the Group Owner in the first frequency band FB1, the WLAN device 310 is unable to communicate (receive or transmit) with the Access Point in the second frequency band FB2. Similarly, during the second 50 ms portion of the predefined time slot, when the WLAN device 310 is communicating as the Station with the Access Point in the second frequency band FB2, the WLAN device 310 is unable to communicate (receive or transmit) with the Group Owner in the first frequency band FB1. Therefore, during the first 50 ms portion of the predefined time slot, when the WLAN device 310 is communicating in the first frequency band FB1 with the Group Owner, the Access Point should be informed that the Access Point should not transmit any data to the WLAN device 310 because, as discussed above, the WLAN device 310 would be unable to receive the data transmitted from the Access Point. For similar reasons, during the second 50 ms portion of the predefined time slot, when the WLAN device 310 is communicating in the second frequency band FB2 with the Access Point, the Group Owner should be informed that the Group Owner should not transmit any data to the WLAN device 310.

However, the Group Owner and/or the Access Point are unaware that the WLAN device 310 is operating in a virtual SDB system. For example, the Group Owner or the Access Point is unaware that the WLAN device 310 communicates in the first frequency band FB1 for 50 ms and then switches to communicate in the second frequency band FB2 for 50 ms. Therefore, to increase efficiency and to avoid interference or loss of data, the Group Owner and/or the Access Point should be informed of the virtual SDB operation of the WLAN device 310.

In one embodiment, the WLAN device 310 may inform the Group Owner and/or the Access Point of the virtual SDB operation of the WLAN device 310 in the following way. When the WLAN device 310 is communicating with the Group Owner in the first frequency band FB1 and prior to switching out from the first time slot to the second time slot, the WLAN device 310 may inform the Group Owner that the WLAN device 310 is going to stop communicating with the Group Owner. Additionally or optionally, upon switching into the second time slot, the WLAN device 310 may inform the Access Point that the WLAN device 310 is ready to communicate with the Access Point in the second frequency band FB2. Similarly, when the WLAN device 310 is communicating with the Access Point in the second frequency band FB1 and prior to switching out from the second time slot, the WLAN device 310 may inform the Access Point that the WLAN device 310 is going to stop communicating with the Access Point. Additionally or optionally, upon switching into the first time slot, their WLAN device 310 may inform the Group Owner that the WLAN device 310 is ready to communicate with the Group Owner.

In one embodiment, the WLAN device 310 may inform the Group Owner and/or the Access Point about the above discussed switching in and out of time slots by transmitting a null data frame (ND). For example, the WLAN device 310 may transmit a null data frame with a "power save" bit set at logic high ND1', ND2' to inform the Group Owner and/or the Access Point that the WLAN device 310 is about to switch out from the current time slot. Also, the WLAN device 310 may transmit a null data frame with the "power save" bit set at logic low ND1, ND2 to inform the Group Owner and/or the Access Point that the WLAN device 310 has switched into the current time slot.

In the embodiment illustrated in FIG. 4, the WLAN device 310 may transmit a null data frame with the "power save" bit set at logic low ND1 to inform the Group Owner that the WLAN device 310 has switched into the current time slot portion of 0-50 ms and is ready to communicate with the Group Owner. The WLAN device 310 may receive the beacon B1 from the Group Owner. Near the end of the timeslot portion, the WLAN device 310 may transmit a null data frame with a "power save" bit set at logic high ND1' to inform the Group Owner that the WLAN device 310 is about to switch out from the current time slot portion of 0-50 ms and to stop communicating with the Group Owner. The WLAN device 310 may then switch from the first (0-50 ms) time slot portion to the second (50-100 ms) time slot portion. Upon switching into the second time slot portion, the WLAN device 310 may transmit a null data frame with the "power save" bit set at logic low ND2 to inform the Access Point that the WLAN device 310 has switched into the current time slot of portion 50-100 ms and is ready to communicate with the Access Point. The WLAN device 310 may receive the beacon B2 from the Station. Near the end of the time slot portion, the WLAN device 310 may transmit a null data frame with a "power save" bit set at logic high ND2' to inform the Station that the WLAN device 310 is about to switch out from the current time slot portion of 50-100 ms and to stop communicating with the Station, and so on.

In another embodiment, when an external device is considering whether to establish communication with the WLAN device 310 that is operating in the virtual SDB system, it is useful for the external device to be aware that the WLAN device 310 is operating in the virtual SDB system. This is because, if the external device establishes communication with the WLAN device 310 operating according to the above discussed dividing of the available time slot (e.g., 100 ms into two 50 ms time slot portions), the external device will receive only a divided share of the total bandwidth provided by the WLAN device 310. However, based on the operating requirements of the external device, the external device may not be able to meet its operating requirements by using only the divided share of the total bandwidth provided by the WLAN device 310. Rather, the external device may establish communication with another WLAN device that may provide more bandwidth with respect to the divided share provided by the WLAN device 310. Therefore, prior to establishing communication with the WLAN device 310, the external device should be informed that the WLAN device 310 is operating in the virtual SDB system.

In another embodiment, when another WLAN device operating in the virtual SDB system is considering whether to establish communication with the WLAN device 310 that is operating in the virtual SDB system, it is useful that (i) the external device be aware that the WLAN device 310 is also operating in the virtual SDB system, and that (ii) the WLAN device 310 be aware that the another WLAN device is also operating in the virtual SDB system. This is because, without being aware that the other WLAN device is also operating in the virtual SDB system, it would be very difficult for the WLAN devices to synchronize their switching time slots. For example, if the WLAN device 310 is already communicating with a Group Owner during its own first time slot, and if the another WLAN device is available to communicate with the WLAN device 310 during a timeframe that only partially overlaps with and/or exactly matches with the first time slot of the WLAN device 310, then the WLAN device 310 may not be able to provide the required bandwidth to the other WLAN device. In this case, the other WLAN device may establish communication with a third device that may provide more bandwidth with respect to the bandwidth provided by the WLAN device 310. Similarly, the other WLAN device may also be unable to provide the bandwidth required by the WLAN device 310, and the WLAN device 310 may establish communication with a third device that may provide more bandwidth with respect to the bandwidth provided by the other WLAN device. Therefore, prior to establishing communication, both, the WLAN device 310 and the other WLAN device, should be informed that the WLAN device 310 and the other WLAN device are operating in the virtual SDB system.

Based on the above discussion, it is clear that prior to establishing communication, the WLAN device 310 should inform the communicating device that the WLAN device 310 is operating in the virtual SDB system, and the WLAN device 310 should also be informed whether the communicating device is operating in the virtual SDB system. Currently, there is no mechanism to inform SDB related features.

Now, in addition to informing other devices of whether the WLAN devices 210, 211, 310 are operating in the real SDB system and/or the virtual SDB system, the other devices also need to be informed of other features (e.g., support for simultaneous data transfer for higher throughput, length of time slot, division of time slot, times related to switching in and out of time slots, etc.) regarding the operation of the WLAN devices 210, 211, 310 in the SDB system and/or any updates to the features. It is advantageous to design a dedicated common element that would serve to inform the other devices of all the features of the WLAN devices 210, 211, 310 associated with the SDB system. To that end, the present disclosure also contemplates a dedicated common information element that would serve to inform the other devices of all the features of the WLAN devices 210, 211, 310 associated with the SDB system.

In one embodiment, each feature related to the operation of the WLAN device 210, 211, 310 in the SDB system is indicated by a respective bit in the common information element. In one embodiment, when a feature related to the operation of the WLAN device 210, 211, 310 is newly supported (i.e., enabled), or when a feature related to the operation of the WLAN device 210, 211, 310 is no longer supported (i.e., disabled), the number of bits in the common information element may be adjusted accordingly. Based on the above characteristics of the common information element, the WLAN device 210, 211, 310 can avoid having to provide a separate and individual information element for each feature related to the operation of the WLAN device 210, 211, 310 in the SDB system. As a result, when a plurality of features related to the operation of the WLAN device 210, 211, 310 in the SDB system are enabled, the length of the transmitted beacon/action frame (discussed below) can be efficiently managed and reduced because all or at least a part of the SDB features are indicated in the same dedicated common information element (instead of using different information elements).

When the WLAN device 210, 211, 310 is operating as the Access Point or as the Group Owner, the WLAN device 210, 211, 310 may include this common information element in the beacons that the WLAN device 210, 211, 310 periodically transmit as the Access Point or as the Group Owner for timing synchronization with another communicating device. Further, additionally or optionally, the WLAN device 210, 211, 310 may include this common information element in probe responses and/or association responses which the WLAN device 210, 211, 310 may transmit in response to probe requests or association requests received from other communicating devices. Now, when the WLAN device 210, 211, 310 is operating as the Station or as the Group Client, the WLAN device 210, 211, 310 may include this common information elements in an association request and/or a probe request that the WLAN device 210, 211, 310 would transmit during association with another communicating device.

In addition, the WLAN device 210, 211, 310 may automatically revise or update the common information element when the ability of the WLAN device 210, 211, 310 to operate in an SDB system (real or virtual) changes. Additionally or optionally, the WLAN device 210, 211, 310 may automatically revise or update the common information element with current state information regarding, for example, whether the current state of the WLAN device 210, 211, 310 as a real SDB device or a virtual SDB device is active. Additionally or optionally, the WLAN device 210, 211, 310 may automatically revise or update the common information element to include any additional information and/or features regarding the operation of the WLAN device 210, 211, 310 in the SDB system by adjusting the number of bits in the common information element, as discussed above.

For example, when the WLAN device 210, 211, 310 is operating as the Access Point or as the Group Owner, the WLAN device 210, 211, 310 may revise and update the common information element, and transmit the updated common information element in the next beacon and onwards. Now, when the WLAN device 210, 211, 310 is operating as the Station or as the Group Client, the WLAN device 210, 211, 310 may revise and update the common information element, and transmit the updated common information element in an action frame. In one embodiment, when the WLAN device 210, 211, 310 receives an SDB request action frame from a communicating device requesting SDB state information of the WLAN device 210, 211, 310, then, in response, the WLAN device 210, 211, 310 may revise and update the common information element and transmit the updated common information element in an SDB information action frame to the communicating device.

Figure 5:
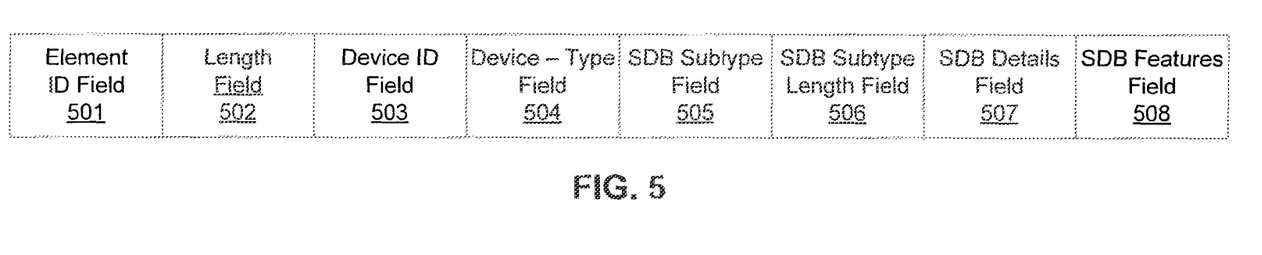
FIG. 5 illustrates an exemplary information element according to an embodiment of the present disclosure.

FIG. 5 illustrates an exemplary common information element 500 for informing the features associated with the real and/or virtual SDB systems according to an embodiment of the present disclosure. The common information element 500 may include a plurality of information fields. These fields may include an element identification (ID) field 501, a length field 502, a device ID field 503, an element type field 504, an SDB subtype field 505, an SDB type-length field 506, an SDB details field 507, and an SDB features field 508.

The element ID field 501 may include identification information regarding the common information element 500. The identification information may include information regarding the WLAN device 210, 211, 310 and/or information regarding a manufacturer or vendor of the WLAN device 210, 211, 310 and/or a timestamp indicating a transmission time of the common information element 500. The length field 502 may include information indicating a total length, in bytes and/or bits, of the information element 500 excluding the length of the element ID field 501 and the length of the length field 502 itself. The device ID field 503 may include identification information of a manufacturer or vendor of the WLAN device 210, 211, 310 and/or the WLAN device 210, 211, 310 that transmits the common information element 500. The device type field 504 may include information indicating that the WLAN device 210, 211, 310 is capable of operating in the SDB system and/or include a specific value assigned by the manufacturer or vendor of the WLAN device 210, 211, 310 that corresponds to the SDB operation of the WLAN device 210, 211, 310. The SDB subtype field 505 may include information regarding different types of SDB information elements designed by the manufacturer or vendor of the WLAN device 210, 211, 310 and/or indicating whether the WLAN device 210, 211, 310 is capable of operating in a real SDB system, or in a virtual SDB system, or in both the real and the virtual SDB systems. The SDB type-length field 506 may include information indicating a total length, in bytes and/or bits, of the SDB details field 507 and the SDB features field 508. The SDB details field 507 may include information indicating the SDB functions supported by the WLAN device 210, 211, 310 and/or a current state of the WLAN device 210, 211, 310. For example, Table 1 illustrates the bits in an exemplary SDB details field 507 which is 1 byte long. As shown in the table 1, the details field can indicate whether either or both virtual SDB or real SDB are supported in Bits 0, 1 and whether either virtual SDB or real SDB are active using Bits 4, 5.

TABLE 1

| Bit Number | Function |
| --- | --- |
| Bit 0 | High: VSDB supported; Low: VSDB not supported |
| Bit 1 | High: RSDB supported; Low: RSDB not supported |
| Bit 2 | Reserved |
| Bit 3 | Reserved |
| Bit 4 | High: VSDB active; Low: VSDB not active |
| Bit 5 | High: RSDB active; Low: RSDB not active |
| Bit 6 | Reserved |
| Bit 7 | Reserved |

The SDB features field 508 has a variable length, in bits or bytes, depending upon a number of SDB features about which the WLAN device 210, 211, 310 may be used to inform the other communicating device of the SDB features of the WLAN device. In one embodiment, each bit included in the SDB features field 508 may serve to indicate information about a respective SDB feature. Because the SDB features field 508 has a variable length, when an SDB feature is newly supported (i.e., enabled), or when an SDB feature is no longer supported (i.e., disabled), the number of bits in the SDB features field 508 may be adjusted accordingly. Based on the above characteristics of the SDB features field 508, the WLAN device 210, 211, 310 can avoid having to provide a separate and individual information element for each enabled or disabled SDB feature. As a result, when a plurality of SDB features related are enabled or disabled, the length of the transmitted beacon/action frame can be efficiently managed and reduced because all these features are indicated in the SDB features field 508 of the same dedicated common information element 500 (instead of being indicated in different information elements as is currently done for non-SDB features).

Figure 6:
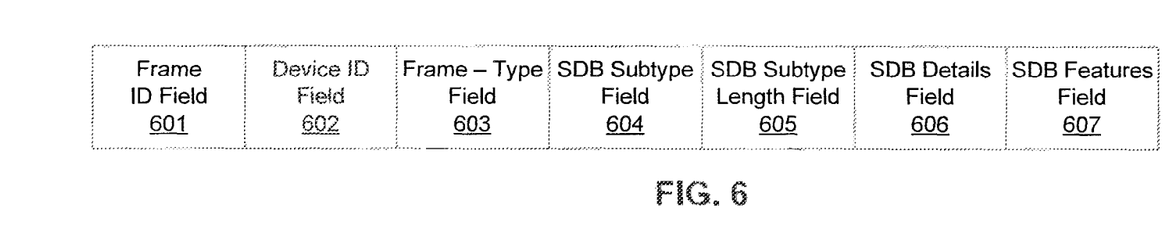
FIG. 6 illustrates an exemplary request action frame according to an embodiment of the present disclosure.

FIG. 6 illustrates an exemplary SDB request action frame 600 for requesting information about supported features associated with the real and/or virtual SDB systems according to an embodiment of the present disclosure. For example, when the WLAN device 210, 211, 310 wishes to determine the SDB features of a communicating device (e.g. P-2-P device 140), the WLAN device 210, 211, 310 may transmit the request action frame 600 to the communicating device to determine SDB capabilities of the communicating device. The request action frame 600 may also include a plurality of fields to inform the communicating device of the SDB capabilities of the WLAN device 210, 211, 310 for consideration of the communicating device. These fields may include a frame identification (ID) field 601, a device ID field 602, a frame type field 603, an SDB subtype field 604, an SDB type-length field 605 an SDB details field 606, and an SDB features field 607.

The frame ID field 601 may include identification information regarding the action frame 600. The identification information may include information indicating that the action frame 600 is a request action frame, information regarding the WLAN device 210, 211, 310, and/or information regarding a manufacturer or vendor of the WLAN device 210, 211, 310 and/or a timestamp indicating a transmission time of the request action frame 600. The device ID field 602 may include identification information of the WLAN device 210, 211, 310 that transmits the action frame 600. The frame type field 603 may include information indicating that the WLAN device 210, 211, 310 is capable of operating in the SDB system and/or include a specific value assigned by the manufacturer or vendor of the WLAN device 210, 211, 310 that corresponds to the SDB operation of the WLAN device 210, 211, 310. The SDB subtype field 604 may include information regarding different types of request action frames designed by the manufacturer or vendor of the WLAN device 210, 211, 310 and/or indicating whether the WLAN device 210, 211, 310 is capable of operating in a real SDB system, or in a virtual SDB system, or in both the real and the virtual SDB systems. The SDB type-length field 605 may include information indicating a total length, in bytes and/or bits, of the SDB details field 606 and the SDB features field 607. The SDB details field 606 may include information indicating the SDB functions supported by the WLAN device 210, 211, 310 and/or a current state of the WLAN device 210, 211, 310. For example, Table 2 illustrates the bits in an exemplary SDB details field 606 which is 1 byte long.

TABLE 2

| Bit Number | Function |
| --- | --- |
| Bit 0 | High: VSDB supported; Low: VSDB not supported |
| Bit 1 | High: RSDB supported; Low: RSDB not supported |
| Bit 2 | Reserved |
| Bit 3 | Reserved |
| Bit 4 | High: VSDB active; Low: VSDB not active |
| Bit 5 | High: RSDB active; Low: RSDB not active |
| Bit 6 | Reserved |
| Bit 7 | Reserved |

The SDB features field 607 has a variable length, in bits or bytes, depending upon a number of SDB features about which the WLAN device 210, 211, 310 may inform the communicating device. In one embodiment, each bit included in the SDB features field 607 may serve to indicate information about a respective SDB feature. Because the SDB features field 607 has a variable length, when an SDB feature is newly supported (i.e., enabled), or when an SDB feature is no longer supported (i.e., disabled), the number of bits in the SDB features field 607 may be adjusted accordingly. Based on the above characteristics of the SDB features field 607, the WLAN device 210, 211, 310 can avoid having to provide a separate and individual request action frame for each enabled or disabled SDB feature. As a result, when a plurality of SDB features related are enabled or disabled, the length of the transmitted action frame can be efficiently managed and reduced because all the SDB features are indicated in the SDB features field 607 of the same dedicated action frame 600 (instead of being indicated in different action frames as is currently done for non-SDB features).

In one embodiment, when the WLAN device 210, 211, 310 is operating as the Station or as the Group Client, the WLAN device 210, 211, 310 may wish to establish communication or associate with an Access Point or a Group Owner respectively. During establishing this communication or association, the WLAN device 210, 211, 310 may transmit a request action frame 600 to request information about the SDB features supported by the Access Point or the Group Owner. This request action frame 600 may include a common information element which advertises or informs the SDB capabilities of the WLAN device 210, 211, 310 to the Access Point or the Group Owner. Additionally or optionally, when the WLAN device 210, 211, 310 is operating as the Station or as the Group Client, the WLAN device 210, 211, 310 may revise and update the common information element, and transmit the updated action frame 600 to advertise or inform the revised or updated SDB capabilities of the WLAN device 210, 211, 310 to the Access Point or the Group Owner.

Figure 7:
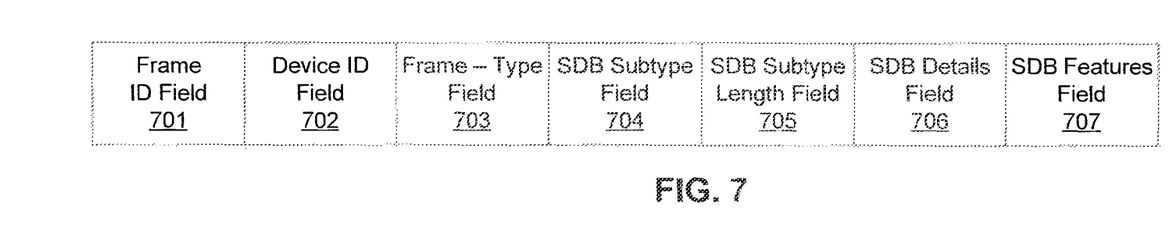
FIG. 7 illustrates an exemplary response action frame according to an embodiment of the present disclosure.

FIG. 7 illustrates an exemplary SDB response action frame 700 for informing the supported features associated with the real and/or virtual SDB systems according to an embodiment of the present disclosure. For example, when the WLAN device 210, 211, 310 receives a request action frame 600 from a communicating device (e.g. P-2-P device 140), that wishes to determine the SDB features of the WLAN device 210, 211, 310, the WLAN device 210, 211, 310 may transmit the response action frame 700 to the communicating device in response to the received request action frame. The response action frame 700 may include a plurality of fields. These fields may include a frame identification (ID) field 701, a device ID field 702, a frame type field 703, an SDB subtype field 704, an SDB type-length field 705 an SDB details field 706, and an SDB features field 707.

The frame ID field 701 may include identification information regarding the action frame 700. The identification information may include information indicating that the action frame 700 is a response action frame being transmitted in response to a received request action frame 600, information regarding the WLAN device 210, 211, 310, and/or information regarding a manufacturer or vendor of the WLAN device 210, 211, 310 and/or a timestamp indicating a transmission time of the response action frame 700. The device ID field 702 may include identification information of the WLAN device 210, 211, 310 that transmits the response action frame 700. The frame type field 703 may include information indicating that the WLAN device 210, 211, 310 is capable of operating in the SDB system and/or include a specific value assigned by the manufacturer or vendor of the WLAN device 210, 211, 310 that corresponds to the SDB operation of the WLAN device 210, 211, 310. The SDB subtype field 704 may include information regarding different types of response action frames designed by the manufacturer or vendor of the WLAN device 210, 211, 310 and/or indicating whether the WLAN device 210, 211, 310 is capable of operating in a real SDB system, or in a virtual SDB system, or in both the real and the virtual SDB systems. The SDB type-length field 705 may include information indicating a total length, in bytes and/or bits, of the SDB details field 706 and the SDB features field 707. The SDB details field 706 may include information indicating the SDB functions supported by the WLAN device 210, 211, 310 and/or a current state of the WLAN device 210, 211, 310. For example, Table 3 illustrates the bits in an exemplary SDB details field 706 which is 1 byte long.

TABLE 3

| Bit Number | Function |
| --- | --- |
| Bit 0 | High: VSDB supported; Low: VSDB not supported |
| Bit 1 | High: RSDB supported; Low: RSDB not supported |
| Bit 2 | Reserved |
| Bit 3 | Reserved |
| Bit 4 | High: VSDB active; Low: VSDB not active |
| Bit 5 | High: RSDB active; Low: RSDB not active |
| Bit 6 | Reserved |
| Bit 7 | Reserved |

The SDB features field 707 has a variable length, in bits or bytes, depending upon a number of SDB features about which the WLAN device 210, 211, 310 may inform the other communicating device. In one embodiment, each bit included in the SDB features field 707 may serve to indicate information about a respective SDB feature. Because the SDB features field 707 has a variable length, when an SDB feature is newly supported (i.e., enabled), or when an SDB feature is no longer supported (i.e., disabled), the number of bits in the SDB features field 707 may be adjusted accordingly. Based on the above characteristics of the SDB features field 707, the WLAN device 210, 211, 310 can avoid having to provide a separate and individual action frame for each enabled or disabled SDB feature. As a result, when a plurality of SDB features related are enabled or disabled, the length of the response action frame can be efficiently managed and reduced because all the SDB features are indicated in the SDB features field 707 of the same dedicated common information element 500 (instead of being indicated in different action frames as is currently done for non-SDB features).

In one embodiment, when the WLAN device 210, 211, 310 is operating as the Access Point or a Group Owner, the WLAN device 210, 211, 310 may receive a request action frame 600 from another communicating device (operating as, for example, a Station or a Group Client) that wishes to establish communication or associate with the WLAN device 210, 211, 310. In response to the request action frame 600, during establishing this communication or association, the WLAN device 210, 211, 310 may transmit the response action frame 700 to inform the other communicating device of the SDB features supported by the WLAN device 210, 211, 310. This response action frame 700 may include a common information element which advertises or informs the SDB capabilities of the WLAN device 210, 211, 310 to the other communicating device. Additionally or optionally, when the WLAN device 210, 211, 310 is operating as the Access Point or a Group Owner, the WLAN device 210, 211, 310 may revise and update the response action frame 700, and transmit the updated response action frame 700 to advertise or inform the revised or updated SDB capabilities of the WLAN device 210, 211, 310 to the other communicating device.

Figure 8:
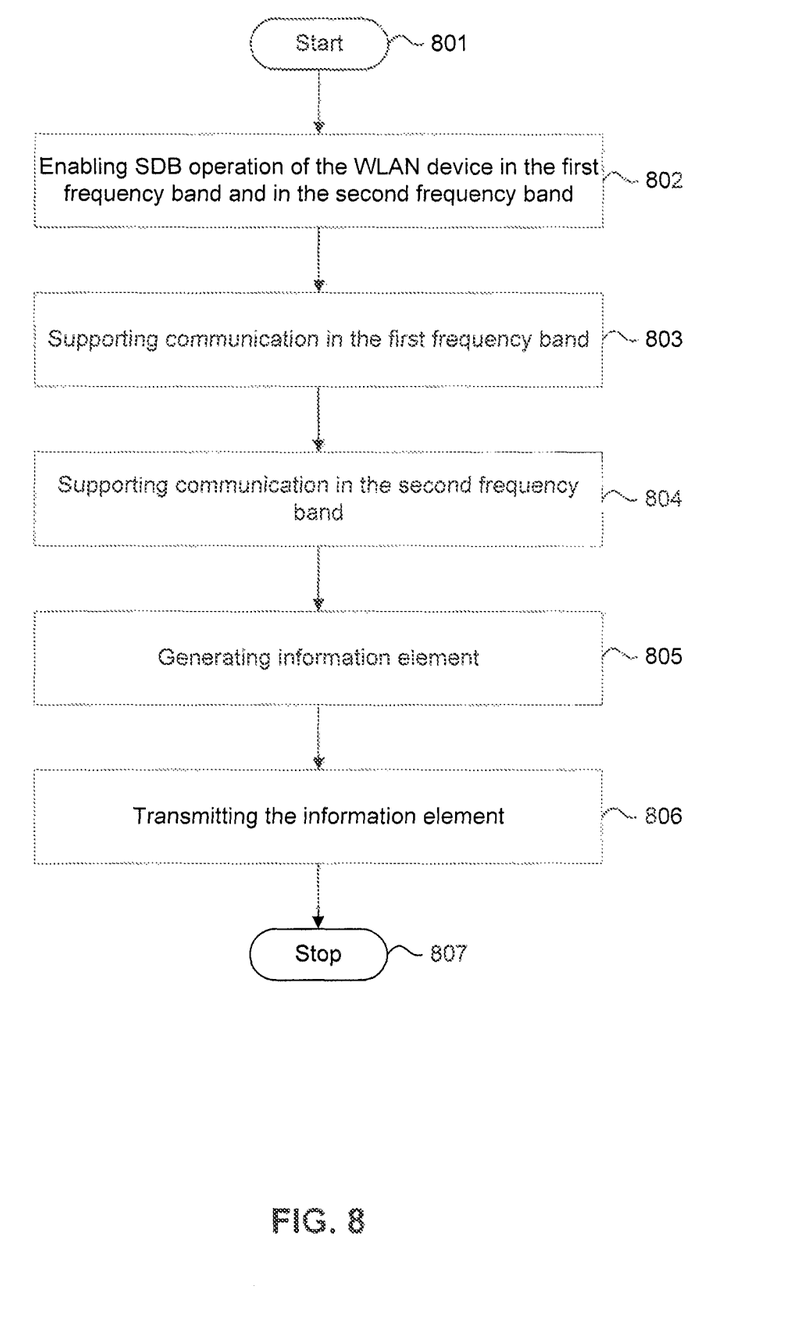
FIG. 8 illustrates an exemplary method according to an embodiment of the present disclosure

FIG. 8 illustrates exemplary method 800 for informing SDB features and capabilities of a WLAN device according to an embodiment of the present disclosure. The method 800 is described with reference to the FIGS. 1-7. The steps described as being included in method 800 may be performed in a different order with respect to the order described below. Further, any of the steps described as being included in method 800 may be performed simultaneously or at different times.

The method 800 starts at step 801. At step 802, simultaneous dual band (SDB) operation of the WLAN device is enabled through at least one antenna in the WLAN device. In one embodiment, the SDB operation includes the WLAN device communicating in a first frequency band with a first device and communicating in a second frequency band with a second device. At step 803, the communication of the WLAN device in the first frequency band with the first device is supported by using, for example, first network interface circuitry. At step 804, the communication of the WLAN device in the second frequency band with the second device is supported by using, for example, second network interface circuitry. At step 805, an information element is generated by using, for example, a processor of the WLAN device. In one embodiment, the generated information element may include all or a part of the information regarding the SDB operation of the WLAN device. At step 806, the information element is transmitted through the at least one antenna to at least one of the first device and the second device. The method stops at step 807.

In one embodiment, enabling the SDB operation may include enabling real SDB operation. Real SDB operation may include, for example, simultaneous communication of the WLAN device in the first frequency band and in the second frequency band through the at least one antenna. In another embodiment, the at least one antenna may include a first antenna and a second antenna, and enabling the SDB operation may include enabling real SDB operation including, for example, simultaneous communication in the first frequency band through the first antenna and communication in the second frequency band through the second antenna.

In one embodiment, enabling the SDB operation may include enabling virtual SDB operation. The virtual SDB operation may include substantially simultaneous communication in the first frequency band and in the second frequency band. For example, enabling the virtual SDB operation may include enabling simultaneous communication in a given time slot, and the time slot may be divided, equally or unequally, for communication in the first frequency band and in the second frequency band.

In one embodiment, generating the information element may include generating the information element to include all or part of the information regarding each SDB feature supported by the WLAN device. In one embodiment, the generating of the information element may include generating the information element that includes a details field configured to include at least one bit dedicated to indicate whether the WLAN device supports real SDB operation or virtual SDB operation. For example, the at least one bit may include a first bit and a second bit. When the first bit is at logic high (e.g., "1"), the information element indicates that the WLAN device supports real SDB operation, and when the second bit is at logic high (e.g., "1"), the information element indicates that the WLAN device supports virtual SDB operation. In one embodiment, the details field may also include at least one bit dedicated to indicate whether the WLAN device is currently operating as a real SDB device or as a virtual SDB device. For example, the at least one bit may include a first bit and a second bit. When the first bit is at logic high (e.g., "1"), the information element indicates that the WLAN device is actively operating as a real SDB device, and when the second bit is at logic high (e.g., "1"), the information element indicates that the WLAN device is actively operating as a virtual SDB device.

In one embodiment, the generating the information element may include generating the information element to include a features field configured to include at least two bits dedicated to indicate respective SDB features supported by the WLAN device. For example, a first bit from among the at least two bits may be dedicated to indicating that the WLAN device allows simultaneous and/or high data transfer during real SDB operation to enable higher throughput. The second bit from among the at least two bits may be dedicated to indicating a duration of the above discussed time slot and/or whether the time slot is equally or unequally divided during SDB operation. Other respective features indicated by the at least two bits include explicitly indicating the above-mentioned channel switching during virtual SDB operation, and/or fast simultaneous scan performed to improve efficiency during the real SDB operation, and/or parallel scan and data transfer operations performed during the SDB operation, and/or prioritizing communication conducted between the Station and the Access Point when the WLAN device operates as the Station or as the Access Point. In one embodiment, the features field may have a variable length, and a number of bits in the features field may be configured to be adjustable based on whether an SDB feature supported by the WLAN device is enabled or disabled.

Figure 9:
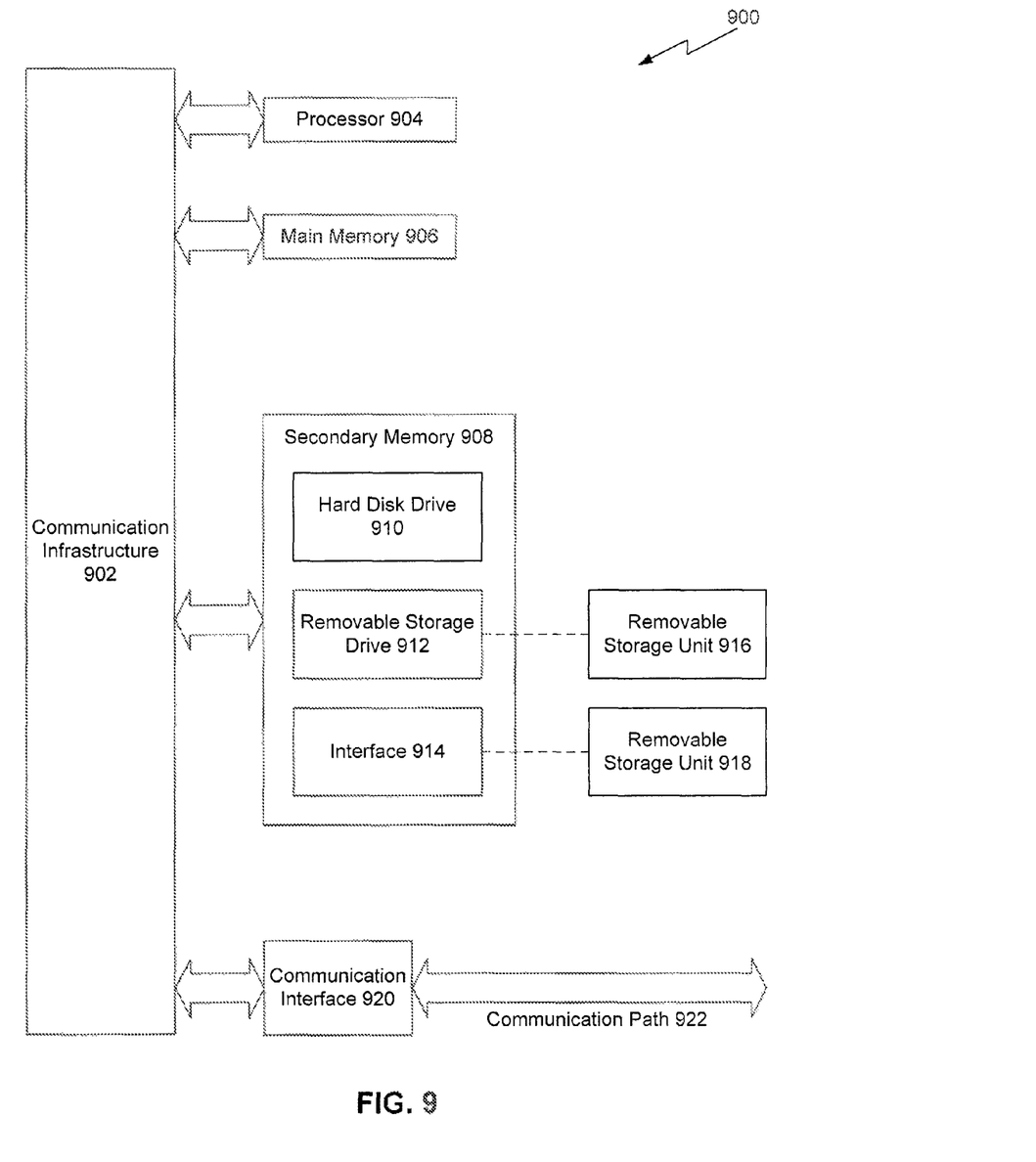
FIG. 9 illustrates an exemplary general purpose computer according to an embodiment of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. One or more of the features depicted in FIGS. 1-4 (e.g., WLAN device 210, 211, 310, front-ends, network interfaces, MACs, etc.) and their corresponding algorithms can be executed on one or more distinct computer systems 900, or a portion thereof. Furthermore, any functions performed by any of the above features can be implemented on one or more distinct computer systems 900.

A computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCMCIA slot and card, etc. Software and data transferred via communications interface 920 are in the form of signals which may be electronic, electromagnetic, optical, or other signals capable of being received by the WLAN device. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to non-transitory, tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900. To implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using a removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

In the above description, numerous specific details are set forth in order to provide a thorough understanding of the disclosure. However, it will be apparent to those skilled in the art that the disclosure including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A wireless local area network (WLAN) device to provide dual band (DB) operation of the WLAN device, the DB operation including communication in a first frequency band with a first device and communication in a second frequency band with a second device, the WLAN device comprising:
   first network interface circuitry configured to support communication in the first frequency band with the first device;
   second network interface circuitry configured to support communication in the second frequency band with the second device; and
   a processor configured to generate an information element including information regarding the DB operation of the WLAN device, and to enable transmission of the information element to the first device or to the second device,
   wherein the DB operation include virtual DB operation including substantially sequential communication in the first frequency band and in the second frequency band within a predetermined time slot,
   wherein the virtual DB operation includes communication in the predefined time slot, the predefined time slot being divided into a first portion for communication in the first frequency band and into a second portion for communication in the second frequency band, and wherein the information element is sent prior to establishing communication and includes a field configured to include at least one bit to indicate that the WLAN device is currently operating as a virtual DB device.

2. The WLAN device of claim 1, wherein the field is further configured to include at least one bit to indicate whether the WLAN device supports the virtual DB operation.

3. The WLAN device of claim 1, wherein the information element includes a second field configured to include at least two bits to indicate respective DB features supported by the WLAN device.

4. The WLAN device of claim 3, wherein the second field has a variable length, and a number of bits in the second field is configured to be adjustable based on whether a DB feature supported by the WLAN device is enabled or disabled.

5. The WLAN device of claim 1, wherein the information element is configured to include information regarding each DB feature supported by the WLAN device.

6. A method for use in a wireless local access network (WLAN) device, the method comprising:

enabling, through at least one antenna in the WLAN device, dual band (DB) operation, the DB operation including communication in a first frequency band with a first device and communication in a second frequency band with a second device;

supporting, by first network interface circuitry, communication in the first frequency band with the first device;

supporting, by second network interface circuitry, communication in the second frequency band with the second device;

generating, in a processor, an information element including information regarding the DB operation of the WLAN device; and transmitting, through the at least one antenna, the information element to the first device or to the second device, wherein enabling the DB operation comprises enabling virtual DB operation including sequential communication in the first frequency band and in the second frequency band, wherein enabling the virtual DB operation comprises enabling sequential communication in a predefined time slot, the time slot being divided into a first portion for communication in the first frequency band and into a second portion for communication in the second frequency band, and wherein the information element is sent prior to establishing communication and includes a field configured to include at least one bit to indicate that the WLAN device is currently operating as the virtual DB device.

7. The method of claim 6, wherein the field is further configured to include at least one bit to indicate whether the WLAN device supports the virtual DB operation.

8. The method of claim 6, wherein generating the information element comprises generating the information element to include a second field configured to include at least two bits to indicate respective DB features supported by the WLAN device.

9. The method of claim 8, wherein the second field has a variable length, and a number of bits in the second field is configured to be adjustable based on whether a DB feature supported by the WLAN device is enabled or disabled.

10. The method of claim 6, wherein generating the information element comprises generating the information element to include information regarding each DB feature supported by the WLAN device.

* * * * *